UNITED STATES PATENT OFFICE.

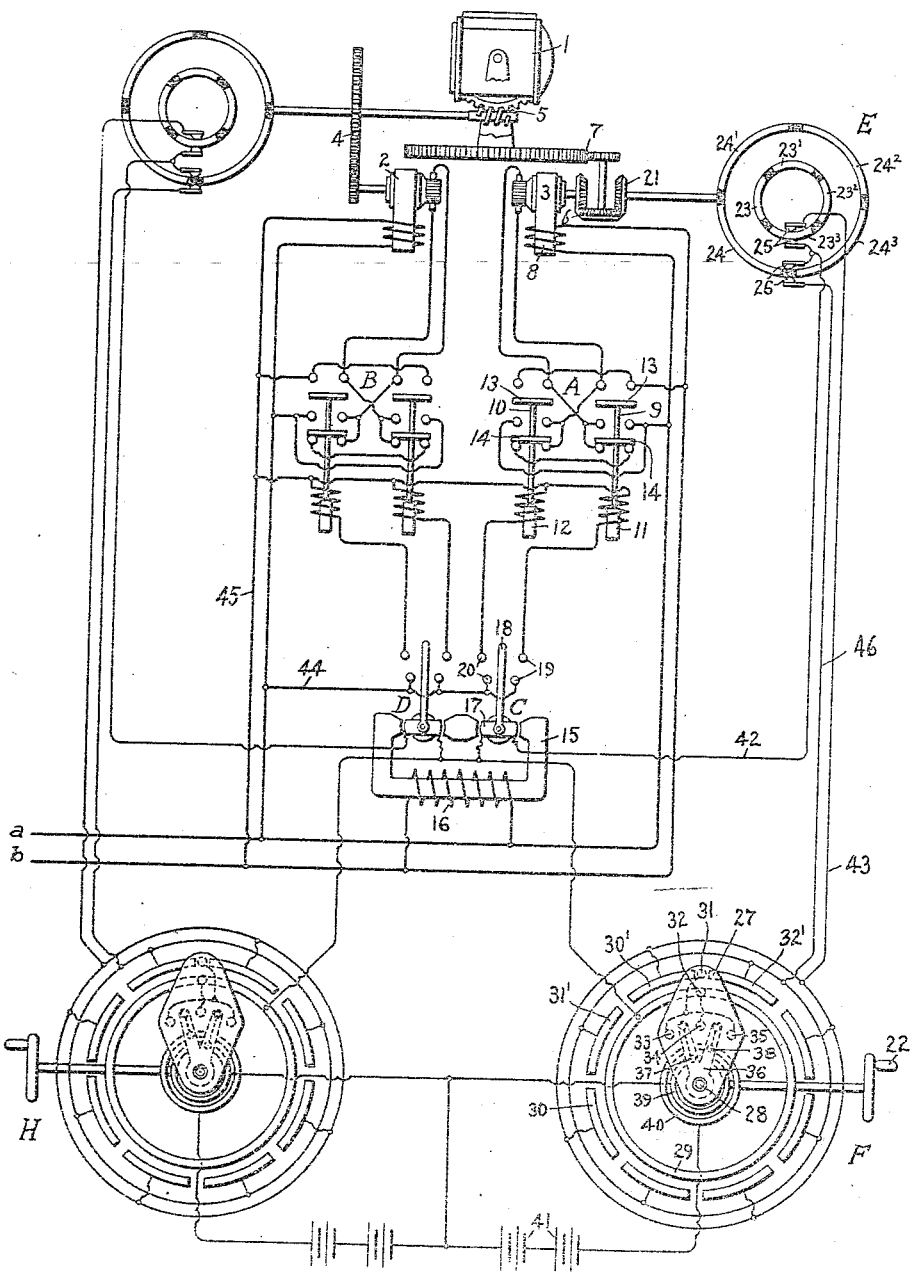

JOHN L. HALL, OF SCHENECTADY, NEW YORK, ASSIGNOR TO GENERAL ELECTRIC COMPANY, A CORPORATION OF NEW YORK.

CONTROL SYSTEM FOR PROJECTORS AND THE LIKE.

1,021,250.  Specification of Letters Patent.  Patented Mar. 26, 1912.

Application filed April 7, 1910. Serial No. 553,984.

*To all whom it may concern:*

Be it known that I, JOHN L. HALL, a citizen of the United States, residing at Schenectady, county of Schenectady, State of New York, have invented certain new and useful Improvements in Control Systems for Projectors and the Like, of which the following is a specification.

This invention relates to the control of searchlight projectors and the like and has for its object the provision of means whereby devices of this character may be controlled from a remote point in a simple and efficient manner.

One of the objects of my invention is to provide an improved control system of the type in which the movement of the projector is in synchronism with the movement of the manipulating mechanism. This synchronous movement has heretofore been accomplished by means of a synchronous motor which operates in connection with the manipulating mechanism to keep the projector in synchronism.

In carrying out my invention I dispense with the use of the synchronous motor and obtain the desired result by means of suitably arranged circuit controllers. The arrangement is such that as the manipulating mechanism is moved through a predetermined arc the projector is moved through a similar arc by an electric motor, and the motor circuit is then opened. The manipulating mechanism is given another movement and the projector follows with a similar movement. The mechanism which opens the motor circuit is driven by the motor so that after a predetermined movement the circuit will be opened; while the manipulating mechanism closes the circuit successively to move the projector as desired.

Another feature of my invention is the provision of a polarized relay whereby the projector may be easily reversed by simply reversing the direction of operation of the manipulating mechanism.

Other features and objects of my invention will appear in the course of the following specification in which I have shown my invention embodied in concrete mechanism for purposes of illustration.

Referring to the drawing, 1 represents the projector which is to be mounted for movement both in a horizontal and in a vertical plane; that is, it may be trained both in azimuth and in altitude. Two motors are provided, 2 and 3, the former for giving the movement in altitude and the latter for azimuth movement. The particular mechanism whereby this is accomplished forms no part of my present invention. It will suffice, therefore, to say that the motor 2 through the spur gearing 4 and the worm gearing 5 moves the projector 1 in a vertical plane, while the motor 3 through the bevel gearing 6 and spur gearing 7 moves the projector in a horizontal plane.

This invention has to do more particularly with the control of motors 2 and 3 and I shall therefore proceed to the description of the circuit controlling means without further description of the operating mechanism of the projector proper.

The system of control consists broadly of two sets of contactors A and B, one for each motor, two polarized relays C and D, one for each set of contactors, and four circuit controlling devices, E, F, G and H; E and F being for relay C and contactors A, while controllers G and H are for relay D and contactors B. The system of control of the motor 2 is identical with that of the motor 3 and it will therefore be necessary to explain only one system in detail. Referring to the motor 3, therefore, it will be seen that the field 8 of the motor is connected directly across the line $a$ $b$, while the armature circuit is controlled by contactor 9 for movement forward and by contactor 10 for movement in reverse direction. Each one of these contactors consists of a solenoid 11 and 12 respectively provided with two bridging contacts 13 and 14 adapted to engage three sets of contact studs, the lowest set being bridged by the contact 14 when the circuit of the solenoid is open, while the two upper sets of studs are bridged when the solenoid is energized.

For controlling the circuit of solenoid 11, as well as the circuit of solenoid 12, I provide the polarized relay C as shown. The movable elements forming the two relays C and D have a common field magnet 15 provided with a winding 16 connected across the line. The moving coil 17 of relay C is provided with a contact finger 18 adapted to bridge the contacts 19 when moved in one direction and contacts 20 when moved in the opposite direction, the movement of the contact finger depending upon the direction of current through the coil. For controlling the circuit of this relay C and thereby controlling the contactors 9 and 10, I provide the two controllers E and F. Controller E is driven by the motor 3 by means of a bevel gear 21, while the controller F is driven manually through the hand wheel 22. The controller E consists of two groups of contacts 23, 23', etc. and 24, 24', etc. These contacts are mounted concentrically as shown, and are insulated from each other. I have shown the controller as consisting of two concentric sets of four contacts each, although it is obvious that this number may be varied as desired. These contacts are adapted to be rotated from the bevel gear 21 by mechanism not shown. The stationary contacts consist of two pairs, 25 and 26, two for each set of contacts. The inner contacts of the pairs are both connected with one terminal of the moving coil 17. The other two contacts are connected with the contact segments on the controller F. This controller F consists of a controlling member 27 pivoted at 28, and a contact ring 29 having concentric contact segments 30 surrounding it. The movable member 27 is provided with a brush 31 for engaging the segments 30 and a brush 32 for engaging the contact ring 29. The member 27 is loosely mounted on the pivot 28 and is provided with three contact pins 33, 34 and 35. Contact pin 34 is electrically connected with brush 32, while pins 33 and 35 are electrically connected with brush 31. Secured to the pivot pin 28 is a forked member 36 having its ends projecting between the contact pins 33, 34, and 35. This member 36 is arranged to be rotated by means of the hand wheel 22 through mechanism not shown, and is provided with two brushes 37 and 38 engaging contact rings 39 and 40, respectively. The arrangement is such that when the handle 22 is turned, the member 36 is moved either in one direction or the other until it engages the contact pins on the member 27 and then forces the member 27 along with it, thus making a lost motion connection between the handle 22 and the member 27. The alternate segments of this controller are in electrical connection so that if the member 27 is moved to the right from the position shown in the drawing, the brush 31 is in electrical connection with four of the contacts 30, while if it is moved to the left, it is in electrical connection with the four alternate contacts. The contact ring 39 is connected to one side of a battery 41, while the ring 40 is connected to the opposite side of the battery. While I have shown a battery as supplying the controlling current, it is obvious that any other source of current may be employed. The arrangement of circuits and mode of operation are as follows: When it is desired to move the projector, the hand wheel is turned in the proper direction. Assuming that the hand wheel is turned so as to move the member 27 in a counter-clockwise direction, the forked member 36 will first engage the contact pins 33 and 34 and will then force the member 27 into engagement with the segment 30'. Assuming at this moment that the controller E is in the position shown, a circuit will be completed as follows: from the positive side of the battery to contact ring 40, brush 38, pin 34, brush 32, contact ring 29, thence through the coil 17 to conductor 42, through contacts 25 and segment $23^3$, conductor 43, segment 30', brush 31, contact pin 33, brush 37, contact ring 39, back to the negative side of the battery. The coil 17 being energized, the contact member 18 is moved, as, for instance, to the right, so as to bridge contacts 19. This energizes the solenoid 11 from the line $a$ through conductor 44, contacts 19, back to the positive main through conductor 45. The solenoid 11 being energized, bridging contacts 13 and 14 are raised to close the armature circuit of the motor 3 as follows: from the line of $a$ to contact 14, thence through the armature of the motor and contact 13 back to line $b$. This starts the motor and shifts the projector in a horizontal plane. As soon as the motor starts, the controller E is likewise rotated so that after the projector has moved through a predetermined arc, the circuit of the motor is broken by contacts 25 passing on to the insulation between the segments. In the mean time the contacts 26 have passed off of the insulation between the contact segments and on to the conducting segment. The arrangement is such that after the controller F is moved on to segment 30' the motor circuit is broken at the contacts 25 before it can be broken at segment 30'. In other words, the operating handle 22 cannot be turned fast enough to move the brush 31 off of contact 30 before the motor moves the controller E to break the relay circuit at contact 25 and open the motor circuit. The motor has now moved the projector through a predetermined arc and the motor circuit has been broken by the dropping of the contacts 13 and 14. The dropping of contact 14 short circuits the armature of the motor and quickly stops it. The hand wheel 22 may now be moved on to the next segment 31' and in doing so a circuit is again completed through the coil 17 of the relay. This time, however, instead of the current passing through the contacts 25, it passes through the contacts 26, since the contacts 25 are on insulation. Current passes, as above, through the coil 17, conductor 42, thence through the contacts 26 and conductor 46, segment 31', and so on, to the negative side of the battery. The motor will now start again and move through a similar arc until the motor has been stopped as before. In this way, every time the controller is moved through a certain arc, in this case one-eighth of a revolution, the controller E is moved through an equal arc and the projector is correspondingly moved. The gearing between the motor and the projector is preferably such that the latter will be moved through a very small angle by a complete revolution of the controller F, so that as it moves very slowly, the pauses may be practically imperceptible. If, now, it is desired to reverse the operation of the motor and thereby reverse the projector, the hand wheel is operated in the opposite direction. This throws the member 36 into engagement with the pins 34 and 35, but this movement alone does not energize coil 17. Assuming that the brush 31 is on segments 31', and it is desired to reverse, the reversal of the hand wheel shifts the brush 31 from segment 31' back on to segment 30'. The motor is not reversed however when it reaches this segment, but only when it has been moved on to the next segment, whereupon the circuit is completed, as follows: from the positive side of the battery through the ring 40, brush 38, pin 35, brush 31, segment 32', conductor 46, across contacts 26, conductor 42, coil 17, thence to brush 32, pin 34, brush 37, back to the negative side of the battery. Each time in reversing a complete segment must be first passed over. This will reverse the relay C and bridge contacts 20 whereby the solenoid 12 is energized and the circuit completed through the armature in the opposite direction. The projector will now be moved forward in the opposite direction, as above. It will be seen that by moving the hand wheel in one direction through a predetermined arc, the projector 1 is moved forward proportionately, and if the hand wheel is reversed the motion is likewise reversed. It is obvious, of course, that training in a vertical plane will be accomplished in a similar manner and it is unnecessary to give a detailed description thereof.

The mechanism for accomplishing the synchronous motion for reversing the direction of operation is exceedingly simple, and while I have shown my invention embodied in concrete form for purposes of illustration, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:—

1. The combination with a projector or the like, of means for training the same comprising an electric motor for driving the projector, a circuit controller therefor driven by said motor and arranged to break the motor circuit after a predetermined movement, and a second controller for closing a circuit through said motor and the first controller in various positions through the same conductor.

2. The combination with a projector or the like, of means for training the same comprising an electric motor for driving the projector, a circuit controller therefor driven by said motor and arranged to intermittently break the circuit after predetermined movements, a second controller, a pair of conductors connecting said controllers, and connections whereby the motor circuit is consecutively closed by the second controller through said conductors alternately.

3. The combination with a projector or the like, of means for training the same comprising an electric motor, a pair of circuit controlling devices operated by said motor and arranged to alternately break the motor circuit after predetermined movements, and an independently actuated circuit controlling device for continuously closing the motor circuit through the motor operated devices alternately.

4. The combination with a projector or the like, of means for training the same comprising an electric motor, and controlling means therefor, said means including independently operated controlling devices, one of which is driven by the motor, and a pair of conductors connecting said devices in series, said devices being arranged to alternately make and break the motor circuit first through one conductor and then through the other conductor.

5. The combination with a projector or the like, of means for training the same comprising an electric motor, a circuit controller therefor driven by said motor having two sets of contacts operating alternately to break the motor circuit, and a manually operated circuit controller having corresponding contacts which consecutively close the motor circuit first through a contact of one set and then through a contact of the other set.

6. The combination with a projector or the like, of means for training the same comprising an electric motor, a circuit controller therefor driven by said motor having two sets of contacts arranged in parallel to alternately break the motor circuit, and a manually operated circuit controller having corresponding contacts which consecutively close the motor circuit first through a contact of one set and then through a contact of the other set.

7. The combination with a projector or the like, of means for training the same, comprising an electric motor, a circuit controller therefor driven by said motor arranged to make two simultaneous contacts during a portion of the movement and break said contacts alternately, and a second circuit controller arranged to complete the circuit through said contacts alternately.

8. The combination with a projector or the like, of means for training the same comprising an electric motor, a rotary circuit controller therefor driven by said motor arranged to make two simultaneous contacts during a portion of the rotation and break said contacts alternately and a second circuit controller arranged to complete a circuit through said contacts alternately by continuous rotation.

9. The combination with a projector or the like, of means for training the same comprising an electric motor, a polarized relay for controlling the motor circuit for forward and reverse operation, a circuit controller driven by the motor arranged to break the circuit of the relay after predetermined movement, and a second controller for closing the circuit through the relay in either direction.

10. The combination with a projector or the like, of means for training the same comprising an electric motor, a polarized relay for controlling the motor circuit for forward and reverse operation, a circuit controller driven by the motor arranged to consecutively break the circuit of the relay after predetermined movements, and a second controller for consecutively closing the circuit of the relay in either direction.

11. The combination with a projector or the like, of means for training the same comprising an electric motor, a polarized relay for controlling the motor circuit for forward and reverse operation, a rotary circuit controller for said relay driven by said motor and arranged to make two simultaneous contacts during a portion of the rotation and break said contacts alternately, and a manually operated circuit controller arranged to complete a circuit through said contacts alternately to energize said relay by continuous rotation in one direction and to complete a circuit through said contacts alternately to reverse said relay by continuous rotation in the opposite direction.

In witness whereof, I have hereunto set my hand this 6th day of April, 1910.

JOHN L. HALL.

Witnesses:
 BENJAMIN B. HULL,
 HELEN ORFORD.